(12) United States Patent
Bhargava et al.

(10) Patent No.: US 8,707,422 B2
(45) Date of Patent: Apr. 22, 2014

(54) METHOD AND APPARATUS FOR PROCESS ENFORCED CONFIGURATION MANAGEMENT

(75) Inventors: Rishi Bhargava, San Jose, CA (US); Chiradeep Vittal, Sunnyvale, CA (US); Swaroop Sayeram, Santa Clara, CA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 13/558,227

(22) Filed: Jul. 25, 2012

(65) Prior Publication Data

US 2012/0290827 A1 Nov. 15, 2012

Related U.S. Application Data

(62) Division of application No. 12/008,274, filed on Jan. 9, 2008, now Pat. No. 8,332,929.

(60) Provisional application No. 60/879,826, filed on Jan. 10, 2007.

(51) Int. Cl.
*H04L 29/06* (2006.01)

(52) U.S. Cl.
USPC .................................................. 726/17

(58) Field of Classification Search
USPC ................................ 726/17, 21, 22
See application file for complete search history.

(56) References Cited

U.S. PATENT DOCUMENTS

| | | | |
|---|---|---|---|
| 4,688,169 A | 8/1987 | Joshi | |
| 4,982,430 A | 1/1991 | Frezza et al. | |
| 5,155,847 A | 10/1992 | Kirouac et al. | |
| 5,222,134 A | 6/1993 | Waite et al. | |
| 5,390,314 A | 2/1995 | Swanson | |
| 5,521,849 A | 5/1996 | Adelson et al. | |
| 5,560,008 A | 9/1996 | Johnson et al. | |
| 5,699,513 A | 12/1997 | Feigen et al. | |
| 5,778,226 A | 7/1998 | Adams et al. | |
| 5,778,349 A | 7/1998 | Okonogi | |
| 5,787,427 A | 7/1998 | Benantar et al. | |

(Continued)

FOREIGN PATENT DOCUMENTS

| | | |
|---|---|---|
| CN | 1383295 A | 12/2002 |
| CN | 103283202 A | 9/2013 |

(Continued)

OTHER PUBLICATIONS

Citrix, CTX 115813—FAX: XenMotion, Live Migration—Citrix Knowledge Center, copyright 1999-2012 Citrix Systems, Inc., retrieved from http://support/citrix.com/article/CTX115813 on Aug. 7, 2012, 2 pages.

(Continued)

*Primary Examiner* — Jason Gee
(74) *Attorney, Agent, or Firm* — Patent Capital Group

(57) ABSTRACT

A system for and method of automatically enforcing a configuration change process for change requests of one or more configurable element within one or more configurable computation systems. The system comprises means for managing a configuration change process for one or more configurable elements within a corresponding configurable computation system, means for generation a configuration request, means for applying a set of authorization rules to the configuration change requests to generate selective authorization of the CEs, and means for selectively locking and unlocking changes to configurable elements within the configurable computational systems.

20 Claims, 4 Drawing Sheets

(56) References Cited

U.S. PATENT DOCUMENTS

| | | |
|---|---|---|
| 5,842,017 A | 11/1998 | Hookway et al. |
| 5,907,709 A | 5/1999 | Cantey et al. |
| 5,907,860 A | 5/1999 | Garibay et al. |
| 5,926,832 A | 7/1999 | Wing et al. |
| 5,944,839 A | 8/1999 | Isenberg |
| 5,974,149 A | 10/1999 | Leppek |
| 5,987,610 A | 11/1999 | Franczek et al. |
| 5,987,611 A | 11/1999 | Freund |
| 5,991,881 A | 11/1999 | Conklin et al. |
| 6,064,815 A | 5/2000 | Hohensee et al. |
| 6,073,142 A | 6/2000 | Geiger et al. |
| 6,141,698 A | 10/2000 | Krishnan et al. |
| 6,192,401 B1 | 2/2001 | Modiri et al. |
| 6,192,475 B1 | 2/2001 | Wallace |
| 6,256,773 B1 | 7/2001 | Bowman-Amuah |
| 6,275,938 B1 | 8/2001 | Bond et al. |
| 6,321,267 B1 | 11/2001 | Donaldson |
| 6,338,149 B1 | 1/2002 | Ciccone, Jr. et al. |
| 6,356,957 B2 | 3/2002 | Sanchez, II et al. |
| 6,393,465 B2 | 5/2002 | Leeds |
| 6,442,686 B1 | 8/2002 | McArdle et al. |
| 6,449,040 B1 | 9/2002 | Fujita |
| 6,453,468 B1 | 9/2002 | D'Souza |
| 6,460,050 B1 | 10/2002 | Pace et al. |
| 6,496,477 B1 | 12/2002 | Perkins et al. |
| 6,587,877 B1 | 7/2003 | Douglis et al. |
| 6,611,925 B1 | 8/2003 | Spear |
| 6,662,219 B1 | 12/2003 | Nishanov et al. |
| 6,748,534 B1 | 6/2004 | Gryaznov et al. |
| 6,769,008 B1 | 7/2004 | Kumar et al. |
| 6,769,115 B1 | 7/2004 | Oldman |
| 6,795,966 B1 | 9/2004 | Lim et al. |
| 6,832,227 B2 | 12/2004 | Seki et al. |
| 6,834,301 B1 | 12/2004 | Hanchett |
| 6,847,993 B1 | 1/2005 | Novaes et al. |
| 6,907,600 B2 | 6/2005 | Neiger et al. |
| 6,918,110 B2 | 7/2005 | Hundt et al. |
| 6,930,985 B1 * | 8/2005 | Rathi et al. .................. 370/254 |
| 6,934,755 B1 | 8/2005 | Saulpaugh et al. |
| 6,988,101 B2 | 1/2006 | Ham et al. |
| 6,988,124 B2 | 1/2006 | Douceur et al. |
| 7,007,302 B1 | 2/2006 | Jagger et al. |
| 7,010,796 B1 | 3/2006 | Strom et al. |
| 7,024,548 B1 | 4/2006 | O'Toole, Jr. |
| 7,039,949 B2 | 5/2006 | Cartmell et al. |
| 7,054,930 B1 | 5/2006 | Cheriton |
| 7,065,767 B2 | 6/2006 | Kambhammettu et al. |
| 7,069,330 B1 | 6/2006 | McArdle et al. |
| 7,082,456 B2 | 7/2006 | Mani-Meitav et al. |
| 7,093,239 B1 | 8/2006 | van der Made |
| 7,124,409 B2 | 10/2006 | Davis et al. |
| 7,139,916 B2 | 11/2006 | Billingsley et al. |
| 7,152,148 B2 | 12/2006 | Williams et al. |
| 7,159,036 B2 | 1/2007 | Hinchliffe et al. |
| 7,177,267 B2 | 2/2007 | Oliver et al. |
| 7,203,864 B2 | 4/2007 | Goin et al. |
| 7,251,655 B2 | 7/2007 | Kaler et al. |
| 7,290,266 B2 | 10/2007 | Gladstone et al. |
| 7,302,558 B2 | 11/2007 | Campbell et al. |
| 7,330,849 B2 | 2/2008 | Gerasoulis et al. |
| 7,346,781 B2 | 3/2008 | Cowle et al. |
| 7,349,931 B2 | 3/2008 | Horne |
| 7,350,204 B2 | 3/2008 | Lambert et al. |
| 7,353,501 B2 | 4/2008 | Tang et al. |
| 7,363,022 B2 | 4/2008 | Whelan et al. |
| 7,370,360 B2 | 5/2008 | van der Made |
| 7,385,938 B1 | 6/2008 | Beckett et al. |
| 7,406,517 B2 | 7/2008 | Hunt et al. |
| 7,441,265 B2 | 10/2008 | Staamann et al. |
| 7,464,408 B1 | 12/2008 | Shah et al. |
| 7,506,155 B1 | 3/2009 | Stewart et al. |
| 7,506,170 B2 | 3/2009 | Finnegan |
| 7,506,364 B2 | 3/2009 | Vayman |
| 7,546,333 B2 | 6/2009 | Alon et al. |
| 7,546,594 B2 | 6/2009 | McGuire et al. |
| 7,552,479 B1 | 6/2009 | Conover et al. |
| 7,577,995 B2 | 8/2009 | Chebolu et al. |
| 7,603,552 B1 | 10/2009 | Sebes et al. |
| 7,607,170 B2 | 10/2009 | Chesla |
| 7,657,599 B2 | 2/2010 | Smith |
| 7,669,195 B1 | 2/2010 | Qumei |
| 7,685,635 B2 | 3/2010 | Vega et al. |
| 7,698,744 B2 | 4/2010 | Fanton et al. |
| 7,703,090 B2 | 4/2010 | Napier et al. |
| 7,739,497 B1 | 6/2010 | Fink et al. |
| 7,757,269 B1 | 7/2010 | Roy-Chowdhury et al. |
| 7,765,538 B2 | 7/2010 | Zweifel et al. |
| 7,783,735 B1 | 8/2010 | Sebes et al. |
| 7,809,704 B2 | 10/2010 | Surendran et al. |
| 7,818,377 B2 | 10/2010 | Whitney et al. |
| 7,823,148 B2 | 10/2010 | Deshpande et al. |
| 7,836,504 B2 | 11/2010 | Ray et al. |
| 7,840,968 B1 | 11/2010 | Sharma et al. |
| 7,849,507 B1 | 12/2010 | Bloch et al. |
| 7,856,661 B1 | 12/2010 | Sebes et al. |
| 7,865,931 B1 | 1/2011 | Stone et al. |
| 7,870,387 B1 | 1/2011 | Bhargava et al. |
| 7,873,955 B1 | 1/2011 | Sebes et al. |
| 7,895,573 B1 | 2/2011 | Bhargava et al. |
| 7,908,653 B2 | 3/2011 | Brickell et al. |
| 7,937,455 B2 | 5/2011 | Saha et al. |
| 7,950,056 B1 | 5/2011 | Satish et al. |
| 7,966,659 B1 | 6/2011 | Wilkinson et al. |
| 7,996,836 B1 | 8/2011 | McCorkendale et al. |
| 8,015,388 B1 | 9/2011 | Rihan et al. |
| 8,015,563 B2 | 9/2011 | Araujo et al. |
| 8,028,340 B2 | 9/2011 | Sebes et al. |
| 8,195,931 B1 | 6/2012 | Sharma et al. |
| 8,234,713 B2 | 7/2012 | Roy-Chowdhury et al. |
| 8,307,437 B2 | 11/2012 | Sebes et al. |
| 8,321,932 B2 | 11/2012 | Bhargava et al. |
| 8,332,929 B1 | 12/2012 | Bhargava et al. |
| 8,352,930 B1 | 1/2013 | Sebes et al. |
| 8,381,284 B2 | 2/2013 | Dang et al. |
| 8,515,075 B1 | 8/2013 | Saraf et al. |
| 8,539,063 B1 | 9/2013 | Sharma et al. |
| 8,544,003 B1 | 9/2013 | Sawhney et al. |
| 8,549,003 B1 | 10/2013 | Bhargava et al. |
| 8,549,546 B2 | 10/2013 | Sharma et al. |
| 8,555,404 B1 | 10/2013 | Sebes et al. |
| 8,561,051 B2 | 10/2013 | Sebes et al. |
| 8,561,082 B2 | 10/2013 | Sharma et al. |
| 2002/0056076 A1 | 5/2002 | van der Made |
| 2002/0069367 A1 * | 6/2002 | Tindal et al. .................. 713/201 |
| 2002/0083175 A1 | 6/2002 | Afek et al. |
| 2002/0099671 A1 | 7/2002 | Mastin et al. |
| 2002/0114319 A1 | 8/2002 | Liu et al. |
| 2003/0014667 A1 | 1/2003 | Kolichtchak |
| 2003/0023736 A1 | 1/2003 | Abkemeier |
| 2003/0033510 A1 | 2/2003 | Dice |
| 2003/0065945 A1 | 4/2003 | Lingafelt et al. |
| 2003/0073894 A1 | 4/2003 | Chiang et al. |
| 2003/0074552 A1 | 4/2003 | Olkin et al. |
| 2003/0115222 A1 | 6/2003 | Oashi et al. |
| 2003/0120601 A1 | 6/2003 | Ouye et al. |
| 2003/0120811 A1 | 6/2003 | Hanson et al. |
| 2003/0120935 A1 | 6/2003 | Teal et al. |
| 2003/0145232 A1 | 7/2003 | Poletto et al. |
| 2003/0163718 A1 | 8/2003 | Johnson et al. |
| 2003/0167292 A1 | 9/2003 | Ross |
| 2003/0167399 A1 | 9/2003 | Audebert et al. |
| 2003/0200332 A1 | 10/2003 | Gupta et al. |
| 2003/0212902 A1 | 11/2003 | van der Made |
| 2003/0220944 A1 | 11/2003 | Schottland et al. |
| 2003/0221190 A1 | 11/2003 | Deshpande et al. |
| 2004/0003258 A1 | 1/2004 | Billingsley et al. |
| 2004/0015554 A1 | 1/2004 | Wilson |
| 2004/0051736 A1 | 3/2004 | Daniell |
| 2004/0054928 A1 | 3/2004 | Hall |
| 2004/0088398 A1 | 5/2004 | Barlow |
| 2004/0143749 A1 | 7/2004 | Tajali et al. |
| 2004/0167906 A1 | 8/2004 | Smith et al. |
| 2004/0172551 A1 | 9/2004 | Fielding et al. |
| 2004/0230963 A1 | 11/2004 | Rothman et al. |

(56) References Cited

U.S. PATENT DOCUMENTS

| | | |
|---|---|---|
| 2004/0243678 A1 | 12/2004 | Smith et al. |
| 2004/0255161 A1 | 12/2004 | Cavanaugh |
| 2004/0268149 A1 | 12/2004 | Aaron |
| 2005/0005006 A1 | 1/2005 | Chauffour et al. |
| 2005/0018651 A1 | 1/2005 | Yan et al. |
| 2005/0086047 A1 | 4/2005 | Uchimoto et al. |
| 2005/0091321 A1 | 4/2005 | Daniell et al. |
| 2005/0108516 A1 | 5/2005 | Balzer et al. |
| 2005/0108562 A1 | 5/2005 | Khazan et al. |
| 2005/0114672 A1 | 5/2005 | Duncan et al. |
| 2005/0132346 A1 | 6/2005 | Tsantilis |
| 2005/0198519 A1 | 9/2005 | Tamura et al. |
| 2005/0228990 A1 | 10/2005 | Kato et al. |
| 2005/0235360 A1 | 10/2005 | Pearson |
| 2005/0257207 A1 | 11/2005 | Blumfield et al. |
| 2005/0257265 A1 | 11/2005 | Cook et al. |
| 2005/0260996 A1 | 11/2005 | Groenendaal |
| 2005/0262558 A1 | 11/2005 | Usov |
| 2005/0273858 A1 | 12/2005 | Zadok et al. |
| 2005/0283823 A1 | 12/2005 | Okajo et al. |
| 2005/0289538 A1 | 12/2005 | Black-Ziegelbein et al. |
| 2006/0004875 A1 | 1/2006 | Baron et al. |
| 2006/0015501 A1 | 1/2006 | Sanamrad et al. |
| 2006/0037016 A1 | 2/2006 | Saha et al. |
| 2006/0072451 A1 | 4/2006 | Ross |
| 2006/0075478 A1 | 4/2006 | Hyndman et al. |
| 2006/0080656 A1 | 4/2006 | Cain et al. |
| 2006/0085785 A1 | 4/2006 | Garrett |
| 2006/0101277 A1 | 5/2006 | Meenan et al. |
| 2006/0133223 A1 | 6/2006 | Nakamura et al. |
| 2006/0136910 A1 | 6/2006 | Brickell et al. |
| 2006/0136911 A1 | 6/2006 | Robinson et al. |
| 2006/0143713 A1 | 6/2006 | Challener et al. |
| 2006/0195906 A1 | 8/2006 | Jin et al. |
| 2006/0200863 A1 | 9/2006 | Ray et al. |
| 2006/0230314 A1 | 10/2006 | Sanjar et al. |
| 2006/0236398 A1 | 10/2006 | Trakic et al. |
| 2006/0259734 A1 | 11/2006 | Sheu et al. |
| 2006/0277603 A1 | 12/2006 | Kelso et al. |
| 2007/0011746 A1 | 1/2007 | Malpani et al. |
| 2007/0028303 A1 | 2/2007 | Brennan |
| 2007/0033645 A1 | 2/2007 | Jones |
| 2007/0039049 A1 | 2/2007 | Kupferman et al. |
| 2007/0050579 A1 | 3/2007 | Hall et al. |
| 2007/0050764 A1 | 3/2007 | Traut |
| 2007/0074199 A1 | 3/2007 | Schoenberg |
| 2007/0083522 A1 | 4/2007 | Nord et al. |
| 2007/0101435 A1 | 5/2007 | Konanka et al. |
| 2007/0136579 A1 | 6/2007 | Levy et al. |
| 2007/0143851 A1 | 6/2007 | Nicodemus et al. |
| 2007/0157303 A1 | 7/2007 | Pankratov |
| 2007/0169079 A1 | 7/2007 | Keller et al. |
| 2007/0192329 A1 | 8/2007 | Croft et al. |
| 2007/0220061 A1 | 9/2007 | Tirosh et al. |
| 2007/0220507 A1 | 9/2007 | Back et al. |
| 2007/0253430 A1 | 11/2007 | Minami et al. |
| 2007/0256138 A1 | 11/2007 | Gadea et al. |
| 2007/0271561 A1 | 11/2007 | Winner et al. |
| 2007/0300215 A1 | 12/2007 | Bardsley |
| 2008/0005737 A1 | 1/2008 | Saha et al. |
| 2008/0005798 A1 | 1/2008 | Ross |
| 2008/0010304 A1 | 1/2008 | Vempala et al. |
| 2008/0022384 A1 | 1/2008 | Yee et al. |
| 2008/0034416 A1 | 2/2008 | Kumar et al. |
| 2008/0034418 A1 | 2/2008 | Venkatraman et al. |
| 2008/0052468 A1 | 2/2008 | Speirs et al. |
| 2008/0082977 A1 | 4/2008 | Araujo et al. |
| 2008/0120499 A1 | 5/2008 | Zimmer et al. |
| 2008/0141371 A1 | 6/2008 | Bradicich et al. |
| 2008/0163207 A1 | 7/2008 | Reumann et al. |
| 2008/0163210 A1 | 7/2008 | Bowman et al. |
| 2008/0165952 A1 | 7/2008 | Smith et al. |
| 2008/0184373 A1 | 7/2008 | Traut et al. |
| 2008/0235534 A1 | 9/2008 | Schunter et al. |
| 2008/0282080 A1 | 11/2008 | Hyndman et al. |
| 2008/0294703 A1 | 11/2008 | Craft et al. |
| 2008/0301770 A1 | 12/2008 | Kinder |
| 2009/0007100 A1 | 1/2009 | Field et al. |
| 2009/0038017 A1 | 2/2009 | Durham et al. |
| 2009/0043993 A1 | 2/2009 | Ford et al. |
| 2009/0055693 A1 | 2/2009 | Budko et al. |
| 2009/0063665 A1 | 3/2009 | Bagepalli et al. |
| 2009/0113110 A1 | 4/2009 | Chen et al. |
| 2009/0144300 A1 | 6/2009 | Chatley et al. |
| 2009/0150639 A1 | 6/2009 | Ohata |
| 2009/0249053 A1 | 10/2009 | Zimmer et al. |
| 2009/0249438 A1 | 10/2009 | Litvin et al. |
| 2009/0328185 A1 | 12/2009 | van den Berg et al. |
| 2010/0049973 A1 | 2/2010 | Chen |
| 2010/0071035 A1 | 3/2010 | Budko et al. |
| 2010/0114825 A1 | 5/2010 | Siddegowda |
| 2010/0188976 A1 | 7/2010 | Rahman et al. |
| 2010/0250895 A1 | 9/2010 | Adams et al. |
| 2010/0281133 A1 | 11/2010 | Brendel |
| 2010/0293225 A1 | 11/2010 | Sebes et al. |
| 2010/0332910 A1 | 12/2010 | Ali et al. |
| 2011/0029772 A1 | 2/2011 | Fanton et al. |
| 2011/0035423 A1 | 2/2011 | Kobayashi et al. |
| 2011/0047542 A1 | 2/2011 | Dang et al. |
| 2011/0047543 A1 | 2/2011 | Mohinder |
| 2011/0077948 A1 | 3/2011 | Sharma et al. |
| 2011/0078550 A1 | 3/2011 | Nabutovsky |
| 2011/0093842 A1 | 4/2011 | Sebes |
| 2011/0093950 A1 | 4/2011 | Bhargava et al. |
| 2011/0113467 A1 | 5/2011 | Agarwal et al. |
| 2011/0119760 A1 | 5/2011 | Sebes et al. |
| 2011/0138461 A1 | 6/2011 | Bhargava et al. |
| 2011/0302647 A1 | 12/2011 | Bhattacharya et al. |
| 2012/0030731 A1 | 2/2012 | Bhargava et al. |
| 2012/0030750 A1 | 2/2012 | Bhargava et al. |
| 2012/0216271 A1 | 8/2012 | Cooper et al. |
| 2012/0278853 A1 | 11/2012 | Chowdhury et al. |
| 2012/0290827 A1 | 11/2012 | Bhargava et al. |
| 2012/0290828 A1 | 11/2012 | Bhargava et al. |
| 2012/0297176 A1 | 11/2012 | Bhargava et al. |
| 2013/0024934 A1 | 1/2013 | Sebes et al. |
| 2013/0091318 A1 | 4/2013 | Bhattacharjee et al. |
| 2013/0097355 A1 | 4/2013 | Dang et al. |
| 2013/0097356 A1 | 4/2013 | Dang et al. |
| 2013/0097658 A1 | 4/2013 | Cooper et al. |
| 2013/0097692 A1 | 4/2013 | Lichtenstadt et al. |
| 2013/0117823 A1 | 5/2013 | Dang et al. |
| 2013/0246044 A1 | 9/2013 | Sharma et al. |
| 2013/0246393 A1 | 9/2013 | Saraf et al. |
| 2013/0246423 A1 | 9/2013 | Bhargava et al. |
| 2013/0246685 A1 | 9/2013 | Bhargava et al. |
| 2013/0247016 A1 | 9/2013 | Sharma et al. |
| 2013/0247027 A1 | 9/2013 | Shah et al. |
| 2013/0247032 A1 | 9/2013 | Bhargava et al. |
| 2013/0247181 A1 | 9/2013 | Saraf et al. |
| 2013/0247192 A1 | 9/2013 | Krasser et al. |
| 2013/0247226 A1 | 9/2013 | Sebes et al. |

FOREIGN PATENT DOCUMENTS

| | | |
|---|---|---|
| EP | 1 482 394 A2 | 12/2004 |
| EP | 2 037 657 A1 | 9/2009 |
| EP | 2599026 | 6/2013 |
| EP | 2599276 | 6/2013 |
| JP | 2004/524598 A | 8/2004 |
| WO | WO 98/44404 | 10/1998 |
| WO | WO 01/84285 A2 | 11/2001 |
| WO | WO 2006/012197 A2 | 2/2006 |
| WO | WO 2006/124832 A1 | 11/2006 |
| WO | WO 2008/054997 A2 | 5/2008 |
| WO | WO 2011/059877 | 5/2011 |
| WO | WO 2012/015485 | 2/2012 |
| WO | WO 2012/015489 | 2/2012 |
| WO | WO 2012/116098 | 8/2012 |

(56) References Cited

FOREIGN PATENT DOCUMENTS

| WO | WO 2013/058940 | 4/2013 |
|----|----------------|--------|
| WO | WO 2013/058944 | 4/2013 |

OTHER PUBLICATIONS

Citrix®, Citrix Synchronizer™ 1.0 RC Administrator Guide, Published May 11, 2010, copyright 2009 Citrix, 32 pages.
U.S. Appl. No. 13/229,502, filed Sep. 9, 2011, entitled System and Method for Passive Threat Detection Using Memory Inspection, Inventor(s) Rishi Bhargava et al.
U.S. Appl. No. 13/558,181, entitled "Method and Apparatus for Process Enforced Configuration Management," filed Jul. 25, 2012, Inventor(s) Rishi Bhargava et al.
U.S. Appl. No. 13/558,277, entitled "Method and Apparatus for Process Enforced Configuration Management," filed Jul. 25, 2012, Inventor(s) Rishi Bhargava et al.
VMware VMotion Product Datasheet, How is VMware VMotion Used in the Enterprise?, copyright 2009 VMware, Inc., retrieved from http://www.vmware.com/files/pfd/VMware-VMotion-DS-EN.pdf, printed Aug. 7, 2012, 2 pages.
VMware vSphere™ Experience Game-changing Virtual Machine Mobility, copyright 2012 VMware, Inc., retrieved from website: http://www.vmware.com/products/vmotion/overview.html, printed Aug. 7, 2012, 2 pages.
VMware vSphere™ Features of VMware vMotion for Live Migration of Virtual Machines, copyright 2012 VMware, Inc., retrieved from http://www.vmware.com/products/vmotion/features.html, printed Aug. 7, 2012, 2 pages.
"Xen Architecture Overview," Xen, dated Feb. 13, 2008, Version 1.2, http://wiki.xensource.com/xenwiki/XenArchitecture?action=AttachFile&do=get&target=Xen+architecture_Q1+2008.pdf, printed Aug. 18, 2009 (9 pages).
Eli M. Dow, et al., "The Xen Hypervisor," INFORMIT, dated Apr. 10, 2008, http://www.informit.com/articles/printerfriendly.aspx?p=1187966, printed Aug. 11, 2009 (13 pages).
Kurt Gutzmann, "Access Control and Session Management in the HTTP Environment," Jan./Feb. 2001, pp. 26-35, IEEE Internet Computing.
U.S. Appl. No. 10/651,591, entitled "Method and System for Containment of Networked Application Client Software by Explicit Human Input," filed Aug. 29, 2003 Inventor(s): Rosen Sharma et al.
U.S. Appl. No. 11/060,683, entitled "Distribution and Installation of Solidified Software on a Computer," filed Feb. 16, 2005, Inventor(s): Bakul Shah et al.
U.S. Appl. No. 11/379,953, entitled "Software Modification by Group to Minimize Breakage," filed Apr. 24, 2006, Inventor(s): E. John Sebes et al.
U.S. Appl. No. 11/437,317, entitled "Connectivity-Based Authorization," filed May 18, 2006, Inventor(s): E. John Sebes et al.
U.S. Appl. No. 12/008,274, entitled Method and Apparatus for Process Enforced Configuration Management, filed Jan. 9, 2008, Inventor(s) Rishi Bhargava et al.
U.S. Appl. No. 12/291,232, entitled "Method of and System for Computer System State Checks," filed Nov. 7, 2008, inventor(s) Rishi Bhargava et al.
U.S. Appl. No. 12/426,859, entitled "Method of and System for Reverse Mapping Vnode Pointers," filed Apr. 20, 2009, Inventor(s): Suman Saraf et al.
U.S. Appl. No. 12/322,220, entitled "Method of and System for Malicious Software Detection Using Critical Address Space Protection," filed Jan. 29, 2009, Inventor(s): Suman Saraf et al.
Desktop Management and Control, Website: http://www.vmware.com/solutions/desktop/, printed Oct. 12, 2009, 1 page.
Secure Mobile Computing, Website: http://www.vmware.com/solutions/desktop/mobile.html, printed Oct. 12, 2009, 2 pages.
U.S. Appl. No. 12/636,414, entitled "System and Method for Managing Virtual Machine Configurations," filed Dec. 11, 2009, Inventor(s) Harvinder Singh Sawhney, et al.
Barrantes et al., "Randomized Instruction Set Emulation to Dispurt Binary Code Injection Attacks," Oct. 27-31, 2003, ACM, pp. 281-289.
Check Point Software Technologies Ltd.: "ZoneAlarm Security Software User Guide Version 9", Aug. 24, 2009, XP002634548, 259 pages, retrieved from Internet: URL:http://download.zonealarm.com/bin/media/pdf/zaclient91_user_manual.pdf.
Gaurav et al., "Countering Code-Injection Attacks with Instruction-Set Randomization," Oct. 27-31, 2003, ACM, pp. 272-280.
Notification of Transmittal of the International Search Report and the Written Opinion of the International Searching Authority (1 page), International Search Report (4 pages), and Written Opinion (3 pages), mailed Mar. 2, 2011, International Application No. PCT/US2010/055520.
Notification of Transmittal of the International Search Report and the Written Opinion of the International Searching Authority, or the Declaration (1 page), International Search Report (6 pages), and Written Opinion of the International Searching Authority (10 pages) for International Application No. PCT/US2011/020677 mailed Jul. 22, 2011.
Notification of Transmittal of the International Search Report and Written Opinion of the International Searching Authority, or the Declaration (1 page), International Search Report (3 pages), and Written Opinion of the International Search Authority (6 pages) for International Application No. PCT/US2011/024869 mailed Jul. 14, 2011.
Tal Garfinkel, et al., "Terra: A Virtual Machine-Based Platform for Trusted Computing," XP-002340992, SOSP'03, Oct. 19-22, 2003, 14 pages.
U.S. Appl. No. 12/880,125, entitled "System and Method for Clustering Host Inventories," filed Sep. 12, 2010, Inventor(s) Rishi Bhargava et al.
U.S. Appl. No. 12/903,993, entitled "Method and System for Containment of Usage of Language Interfaces," filed Oct. 13, 2010, Inventor(s) Rosen Sharma, et al.
U.S. Appl. No. 12/946,344, entitled "Method and System for Containment of Usage of Language Interfaces," filed Nov. 15, 2010, Inventor(s) Rosen Sharma, et al.
U.S. Appl. No. 13/012,138, entitled "System and Method for Selectively Grouping and Managing Program Files," filed Jan. 24, 2011, Inventor(s) Rishi Bhargava et al.
U.S. Appl. No. 13/037,988, entitled "System and Method for Botnet Detection by Comprehensive Email Behavioral Analysis," filed Mar. 1, 2011, Inventor(s) Sven Krasser, et al.
U.S. Appl. No. 12/322,321, entitled "Method of and System for Computer System Denial-of-Service Protection," filed Jan. 29, 2009, Inventor(s): Suman Saraf et al.
IA-32 Intel® Architecture Software Developer's Manual, vol. 3B; Jun. 2006; pp. 13, 15, 22 and 145-146.
Notification of International Preliminary Report on Patentability and Written Opinion mailed May 24, 2012 for International Application No. PCT/US2010/055520, 5 pages.
Sailer et al., sHype: Secure Hypervisor Approach to Trusted Virtualized Systems, IBM research Report, Feb. 2, 2005, 13 pages.
Myung-Sup Kim et al., "A load cluster management system using SNMP and web", [Online], May 2002, pp. 367-378, [Retrieved from Internet on Oct. 24, 2012], <http://onlinelibrary.wiley.com/doi/10.1002/nem.453/pdf>.
G. Pruett et al., "BladeCenter systems management software", [Online], Nov. 2005, pp. 963-975, [Retrieved from Internet on Oct. 24, 2012], <http://citeseerx.lst.psu.edu/viewdoc/download?doi=10.1.1.91.5091&rep=rep1&type=pdf>.
Philip M. Papadopoulos et al., "NPACI Rocks: tools and techniques for easily deploying manageable Linux clusters" [Online], Aug. 2002, pp. 707-725, [Retrieved from internet on Oct. 24, 2012], <http://onlinelibrary.wiley.com/doi/10.1002/cpe.722/pdf>.
Thomas Staub et al., "Secure Remote Management and Software Distribution for Wireless Mesh Networks", [Online], Sep. 2007, pp. 1-8, [Retrieved from Internet on Oct. 24, 2012], <http://cds.unibe.ch/research/pub_files/B07.pdf>.
"What's New: McAfee VirusScan Enterprise, 8.8," copyright 2010, retrieved on Nov. 23, 2012 at https://kc.mcafee.com/resources/sites/

(56) References Cited

OTHER PUBLICATIONS

MCAFEE/content/live/PRODUCT_DOCUMENTATION/22000/PD22973/en_US/VSE%208.8%20-%20What's%20New.pdf, 4 pages.
"McAfee Management for Optimized Virtual Environments," copyright 2012, retrieved on Nov. 26, 2012 at AntiVirushttp://www.mcafee.com/us/resources/data-sheets/ds-move-anti-virus.pdf, 2 pages.
Rivest, R., "The MD5 Message-Digest Algorithm", RFC 1321, Apr. 1992, retrieved on Dec. 14, 2012 from http://www.ietf.org/rfc/rfc1321.txt, 21 pages.
Hinden, R. And B. Haberman, "Unique Local IPv6 Unicast Addresses", RFC 4193, Oct. 2005, retrieved on Nov. 20, 2012 from http://tools.ietf.org/pdf/rfc4193.pdf, 17 pages.
"Secure Hash Standard (SHS)", Federal Information Processing Standards Publication, FIPS PUB 180-4, Mar. 2012, retrieved on Dec. 14, 2012 from http://csrc.nist.gov/publications/fips/fips180-4/fips-180-4.pdf, 35 pages.
U.S. Appl. No. 13/728,705, filed Dec. 27, 2012, entitled "Herd Based Scan Avoidance System in a Network Environment,", Inventors Venkata Ramanan, et al.
An Analysis of Address Space Layout Randomization on Windows Vista™, Symantec Advanced Threat Research, copyright 2007 Symantec Corporation, available at http://www.symantec.com/avcenter/reference/Address_Space_Layout_Randomization.pdf, 19 pages.
Bhatkar, et al., "Efficient Techniques for Comprehensive Protection from Memory Error Exploits," USENIX Association, 14th USENIX Security Symposium, Aug. 1-5, 2005, Baltimore, MD, 16 pages.
Dewan, et al., "A Hypervisor-Based System for Protecting Software Runtime Memory and Persistent Storage," Spring Simulation Multiconference 2008, Apr. 14-17, 2008, Ottawa, Canada, (available at website: www.vodun.org/papers/2008_secure_locker_submit_v1-1.pdf, printed Oct. 11, 2011), 8 pages.
Shacham, et al., "On the Effectiveness of Address-Space Randomization," CCS'04, Oct. 25-29, 2004, Washington, D.C., Copyright 2004, 10 pages.
International Search Report and Written Opinion mailed Dec. 14, 2012 for International Application No. PCT/US2012/055674, 9 pages.
International Preliminary Report on Patentability and Written Opinion issued Jan. 29, 2013 for International Application No. PCT/US2011/020677 (9 pages).
International Preliminary Report on Patentability and Written Opinion issued Jan. 29, 2013 for International Application No. PCT/US2011/024869 (6 pages).
Datagram Transport Layer Security Request for Comments 4347, E. Rescorla, et al., Stanford University, Apr. 2006, retrieved and printed on Oct. 17, 2011 from http://tools.ietf.org/pdf/rfc4347.pdf, 26 pages.
Internet Control Message Protocol Request for Comments 792, J. Postel, ISI, Sep. 1981, retrieved and printed on Oct. 17, 2011 from http://tools.ietf.org/html/rfc792, 22 pages.
Mathew J. Schwartz, "Palo Alto Introduces Security for Cloud, Mobile Users," retrieved Feb. 9, 2011 from http://www.informationweek.com/news/security/perimeter/showArticle.jhtml?articleID-22, 4 pages.
Requirements for IV Version 4 Routers Request for Comments 1812, F. Baker, Cisco Systems, Jun. 1995, retrieved and printed on Oct. 17, 2011 from http://tools.ietf.org/pdf/rfc1812.pdf, 176 pages.
The Keyed-Hash Message Authentication Code (HMAC), FIPS PUB 198, Issued Mar. 6, 2002, Federal Information Processing Standards Publication, retrieved and printed on Oct. 17, 2011 from http://csrc.nist.gov/publications/fips/fips198/fips-198a.pdf, 20 pages.
Zhen Chen et al., "Application Level Network Access Control System Based on TNC Architecture for Enterprise Network," In: Wireless communications Networking and Information Security (WCNIS), 2010 IEEE International Conference, Jun. 25-27, 2010 (5 pages).
International Search Report and Written Opinion, International Application No. PCT/US2012/026169, mailed Jun. 18, 2012, 11 pages.
International Search Report and Written Opinion, International Application No. PCT/US2012/057312, mailed Jan. 31, 2013, 10 pages.
International Search Report and Written Opinion, International Application No. PCT/US2012/057153, mailed Dec. 26, 2012, 8 pages.
U.S. Appl. No. 13/437,900, filed Apr. 2, 2012, entitled "System and Method for Interlocking a Host and a Gateway,", Inventors: Geoffrey Howard Cooper, et al.
Narten et al., RFC 4861, "Neighbor Discovery for IP version 6 (IPv6)", Sep. 2007, retrieved from http://tools.ietf.org/html/rfc4861, 194 pages [Parts 1, 2 and 3].
International Preliminary Report on Patentability, International Application No. PCT/US2012/026169, issued Aug. 27, 2013, 8 pages.
USPTO Aug. 14, 2013 Notice of Allowance from U.S. Appl. No. 13/540,448.
U.S. Appl. No. 14/045,208, filed Oct. 3, 2013, entitled "Execution Environment File Inventory,", Inventors Rishi Bhargava, et al.
USPTO Terminal Disclaimer of 7,757,269 from U.S. Appl. No. 13/540,448, filed Jul. 10, 2013, 1 page.
USPTO Response to Office Action received for U.S. Appl. No. 13/540,448, filed Jul. 10, 2013, 13 pages.
USPTO Terminal Disclaimer of 8,234,713 from U.S. Appl. No. 13/540,448, filed Jul. 10, 2013, 1 page.
USPTO Office Action received for U.S. Appl. No. 13/540,448, mailed on Apr. 10, 2013, 20 pages.
USPTO Response to Office Action received for U.S. Appl. No. 13/558,181, filed Oct. 24, 2013, 11 pages.
USPTO Office Action received for U.S. Appl. No. 13/558,181, mailed on Aug. 7, 2013, 13 pages.
USPTO Response to Office Action received for U.S. Appl. No. 13/558,181, filed Jul. 22, 2013, 12 pages.
USPTO Office Action received for U.S. Appl. No. 13/558,181, mailed on May 8, 2013, 13 pages.
USPTO Office Action received for U.S. Appl. No. 13/558,277, mailed on Oct. 3, 2013, 11 pages.
USPTO Response to Office Action received for U.S. Appl. No. 13/558,277, filed Sep. 10, 2013, 17 pages.
USTPO Office Action received for U.S. Appl. No. 13/558,277, mailed on May 10, 2013, 22 pages.
USPTO Response to Office Action received for U.S. Appl. No. 12/291,232, filed Jan. 18, 2012, 14 pages.
USPTO Office Action received for U.S. Appl. No. 12/291,232, mailed on Oct. 18, 2011, 17 pages.
USPTO Response to Office Action received for U.S. Appl. No. 12/291,232, filed Jul. 25, 2011, 13 pages.
USPTO Office Action received for U.S. Appl. No. 12/291,232, mailed on Apr. 25, 2011, 23 pages.
PCT Application Serial No. PCT/US13/66690, filed Oct. 24, 2013, entitled "Agent Assisted Malicious Application Blocking in a Network Environment," 67 pages.
Patent Examination Report No. 1, Australian Application No. 2011283160, mailed Oct. 30, 2013.

\* cited by examiner

METHOD AND APPARATUS FOR PROCESS ENFORCED CONFIGURATION MANAGEMENT

RELATED APPLICATIONS

This application is a divisional (and claims the benefit of priority under 35 U.S.C. §120 and §121) of U.S. application Ser. No. 12/008,274, filed Jan. 9, 2008 now U.S. Pat. No. 8,332,929, entitled "METHOD AND APPARATUS FOR PROCESS ENFORCED CONFIGURATION MANAGEMENT," Inventor(s) Rishi Bhargava, et al., which is a non-provisional which claims priority under 35 U.S.C. §119(e) of the co-pending, co-owned U.S. Provisional Patent Application, Ser. No. 60/879,826, filed Jan. 10, 2007, and entitled "SOFTWARE THAT MESSAGES CHANGE CONTROL." The disclosure of the prior applications is considered part of (and is incorporated by reference in) the disclosure of this application.

FIELD OF THE INVENTION

The invention relates to systems and processes for enforcing and monitoring a configuration management process for configurable elements in configurable computational systems.

BACKGROUND OF THE INVENTION

Mechanisms currently exist for the management of configurable systems. These systems, referred to as Change/Configuration Management System (CMS) or Ticketing Systems define a business process or rules for making configuration changes. The configuration changes at issue are changes to configurable computation systems (CCS), which can be coupled together over a network or through other communication means. These CCSs can include but are not limited to servers, desktop system, personal computers, directory servers, database servers, work stations, programmable factory equipment, PDAs, cell phones, microchip, software, network devices, and virtual machines. Configuration change includes but not limited to content changes for files, permission changes on files, file creation, file deletion, registry key creation, registry key deletion, registry value changes, environment variable creation, environment variable deletion, environment variable value changes, virtual machine creation, virtual machine deletion, virtual machine restart, virtual machine settings changes, network configuration change, database settings changes and database data changes. With a CCS, a configuration change may effect one or more configurable elements (CEs). These CEs include but are not limited to files within a file system, registry settings, environment variables, databases, virtual machine settings, networked device configuration parameters, computationally controlled mechanical switches, and electronically controlled valve settings.

While using a CMS system defines a business process for making and managing changes to CCSs and the corresponding CEs, the CMS system does not automatically enforce, control, or monitor such changes. Human discipline, monitoring, encouragement, and other incentives have to be used to enforce a configuration management process. Thus, a system enforced by human implementation is subject to human nature and human imperfection. People will work around the system. Alternatively, due to human nature, error, or misunderstanding changes are made outside of the defined process, such as making changes at inappropriate times, or making other improper changes.

What is need is method and apparatus for automatically enforcing a defined process for making changes to a CE within a CCS, or monitoring the changes in a CCSs or CEs in relations to a define configuration management processes.

SUMMARY OF THE INVENTION

The invention allows for the enforcement and monitoring of a configuration management process as applied to configurable elements (CEs) within a configurable computing system (CCSs). Changes to CEs within CCSs are controlled by a selectable lock that only enable changes to the CEs when the rules for the change management process is met. Also, the invention provides a less restrictive configuration management process where changes are monitored and reconciled against configuration change requests and change authorization rules.

In a first aspect of the invention, a method of automatically enforcing a configuration change process for one or more configuration change requests to one or more configurable elements within a single or multiple configurable computational elements is disclosed. The method involves the steps of accessing the change process rules, analyzing the configuration change requests utilizing the rules, selectively authorizing the configuration changes to the configurable elements for the configurable elements that comply with the change process rules for the respective change request, and selectively enabling a lock to allow configuration changes on a configurable computational system containing the configurable elements. The analysis of the configuration change request can be based on the state of the configuration change request which can include external authorizations. The state of the external authorizations can be evaluated with the accessed change process rules. The selective authorization is based on the state of the configuration change request being evaluated utilizing the accessed change process rules.

In one embodiment, the analyzing of the configuration change request further utilizes current conditions in the determination of the selective authorization of configuration changes of CEs. These current conditions can include but are not limited to the current time, date, day of the week, and any electronically retrievable value representing a level or quantity such as an inventory value, and the mechanical state of a switch or valve.

In another embodiment of the invention, the configuration of the selective locks involves the authenticating the selective authorization of the configuration change of the configurable elements. Preferable, the authentication can be performed by an SSL key exchange.

In a further embodiment of the invention, the selective locks generate status information related to configuration changes in the CEs for the corresponding CCSs. The status information can include but is not limited to the status of the CE configuration change, whether the changes succeed or failed, and information relating to the failure of the configuration change.

In another embodiment of the present invention the status information is associated with configuration change request. The status change request can further be associated with the corresponding CEs. Further, an association can be made with the CCS, successful configuration changes, failed configuration changes, or the information regarding the failure of the configuration change.

In a further embodiment, the associated information is used to generate reports of at least the status of the configuration change requests, the changes to the CE, the configuration changes to the CCS.

In a second aspect of the present invention, a system for automatically enforcing a configuration change process for one or more configurable element (CE) within a configurable computation system (CCS) is disclosed. The system is comprised of means for managing a configuration change process for CEs within CCSs, means for generating a configuration change request, means for applying one or more configuration change rules to a configuration change request to generate a selective configuration change authorization of the one or more CEs, and means for selectively locking configuration changes in a CCS wherein the means for locking can selectively enable configuration changes to the one or more CE based on the selective configuration authorization. The means for managing a configuration change process can include standard configuration management systems (CMSs) which can also be referred to as ticketing systems. These CMS systems receive requests for a configuration change which then generate a configuration change ticket. Before a fully authorized ticket is generated, various authorization inputs are required. These inputs define a configuration management process to be followed. The means for applying authorization rules generates selective configuration authorization for one or more CEs based on configuration change authorization.

In one embodiment, wherein the means for applying the one or more configuration change rules further includes utilizing current conditions in the determination of the selective authorization of configuration changes of CEs. These current conditions can include but are not limited to the current time, date, day of the week, any electronically retrievable value representing a level or quantity such as an inventory value, and mechanical state of a switch or valve.

In another embodiment of the invention, the means for locking and unlocking the configuration includes authenticating the selective authorization of the configuration change of the CE. Preferable, the authentication can be performed by an SSL key exchange.

In a further embodiment of the invention, the means for selectively locking configuration changes in a CCS generates status information related to configuration changes in the configurable elements for the corresponding CCSs. The status information can include but is not limited to a change of configuration status of a CE, whether the change succeed or failed, and information relating to the failure cause of the configuration change.

In another embodiment of the present invention further comprises means for associating the status information with the configuration change request. The status information and change request can further be associated with the corresponding CEs. Further, associations can be made with elements including the CCSs, successful configuration changes, failed configuration changes, or the information regarding the failure of the configuration change.

In a further embodiment, the means for applying the one or more authorization rules generates reports comprising the associated status information, the configuration change requests, the configuration changes to the CE, the configuration changes to the CCS.

In another aspect of the present invention, a system for automatically monitoring a configuration change process for one or more CE within a CCS. The system is comprised of a means for selectively monitoring configuration changes to one or more CEs within a CCS, a means for managing a configuration change, and a means for processing the configuration change status information. The means for selectively monitoring configuration changes generates configuration change status information. The means for managing a configuration change process generates one or more configuration change requests. Further, the means for processing utilizes the configuration change status information, the one or more configuration change requests, and the one or more configuration change rules for the CEs. The processing associates the configuration changes with the configuration change requests and determines if the configuration changes complied with the one or more associated configuration change rules.

In one embodiment of the invention, the means for processing can include current conditions as part of the analysis. In another embodiment, the invention further comprises a means for generating reports where the configuration change status information is associated with at least one of the CE and the CCS.

In another aspect of the invention, a method of automatically monitoring a configuration change process for one or more configuration change requests to one or more CEs within at least one CCS is disclosed. The steps are comprised of generation configuration stat change information from a CCS and corresponding to on or more CEs, accessing one or more configuration change rules where the rules are associated with a configuration change to one or more CEs within a CCS. In one embodiment of the invention, the means for processing can include one or more current conditions as part of the analysis.

BRIEF DESCRIPTION OF THE DRAWINGS

The invention is better understood by reading the following detailed description of an exemplary embodiments in conjunction with the accompanying drawings.

DETAILED DESCRIPTION OF THE INVENTION

The following description of the invention is provided as an enabling teaching of the invention in its best, currently known embodiment. Those skilled in the relevant art will recognize that many changes can be made to the embodiment described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present inventions are possible and can even be desirable in certain circumstances, and are a part of the present invention. Thus, the following description is provided as illustrative of the principles of the present invention and not in limitation thereof, since the scope of the present invention is defined by the claims.

The illustrative embodiments of the invention provide the means for enforcing, monitoring and reconciling a business management process for making configuration changes to configurable systems. The benefits of such a system are numerous. First, in the enforcement mode, configuration changes to configurable system such as servers, factory controllers, office automation systems can be controlled to prevent problems not limited to, loss of productivity because of down time at inappropriate times, and quality and performance issues caused by operations running with an improper configuration. Further, with Sarbanes-Oxley the regulatory environment demands stronger control over financial systems. Thus, being able to control changes to financial systems such as software packages and databases gives an organization higher confidence that business critical process are being followed and unauthorized changes are not made.

Figure 1:
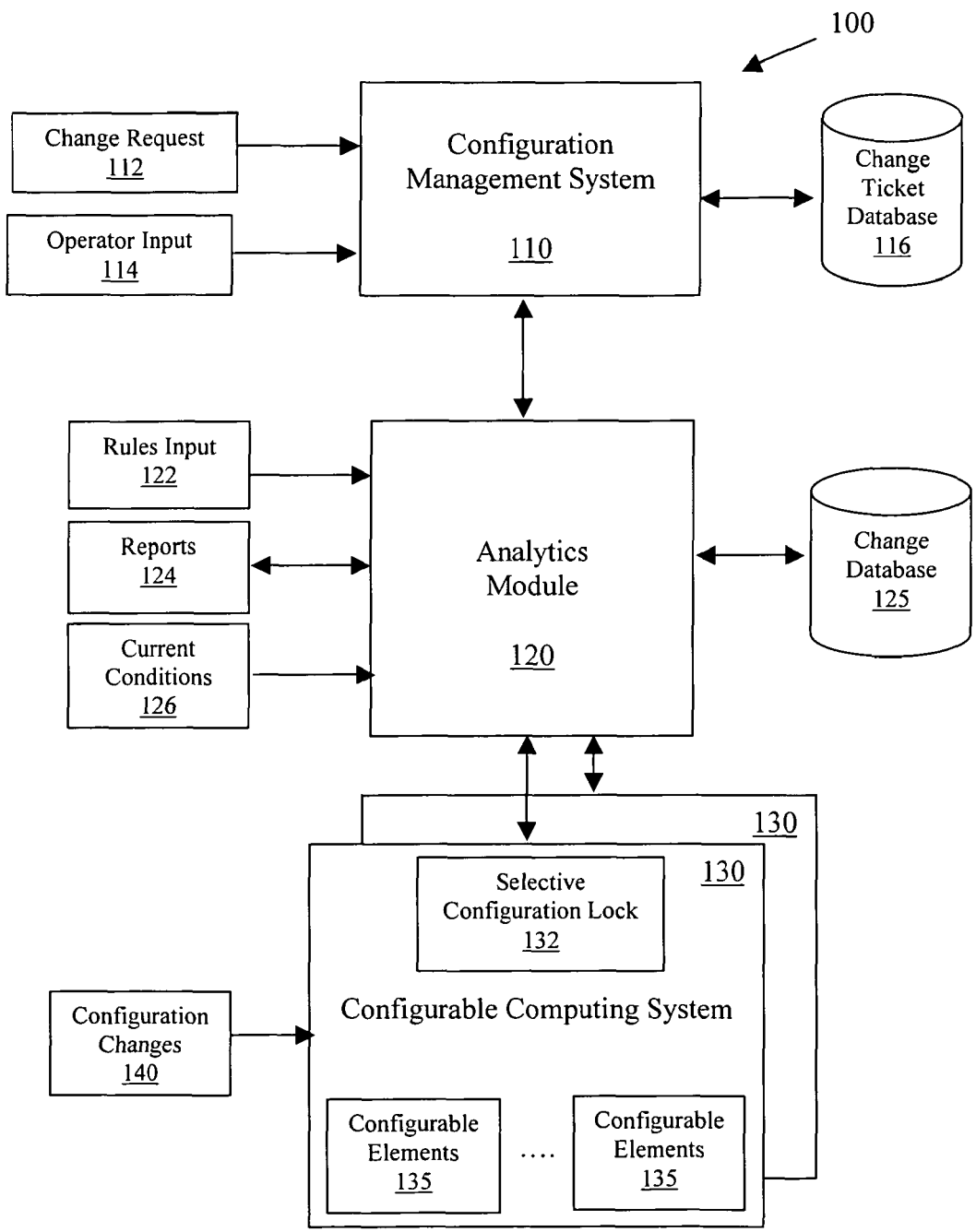
FIG. 1 illustrates a system for enforcing a configuration management process on configurable elements within a configurable computation system.

An illustrative embodiment of the present invention is shown in FIG. 1. The system 100 automatically enforces a configuration change process for a configuration change of one or more configurable elements (CEs) 135 within a configurable computational system (CCS) 130. The system comprises a configuration management system (CMS) 110 coupled to an analytics module 120 which is coupled to at least one CCS 130. The CCS 130 contains a selective configuration lock 132 and of one or more configurable elements CEs 135. A rule input module 122 is coupled to the analytics module 120 is for configuring change authorization rules within the analytics module 120. An output reporting module 124 for requesting and displaying reports on status information regarding the result of configuration changes to the CEs 135 within the CCS 130 is also coupled to the analytics module 120. Also, coupled to the analytics module 120 is a change database 125 holding configuration change status information for the generation of reports on the configuration status of the CEs 135 and CCSs 130.

The CMS 110 is used for generating a configuration change(s) authorization for one or more CEs 135 within one or more CCSs 130 according to a specific business process. Preferably the CMS 110 is configured with the change authorization requirements. For example, to authorize a change can require the authorization by two senior officers of a company. Input to the CCS 110 is a configuration change request 112 preferably corresponding to a configuration change to one or more CEs 135 within one or more CCSs 130. The change request 112 preferably generates a change ticket that requires authorizations before authorized implementation. Preferably, the change ticket is stored in the change ticket database 116. The change ticket database 116 stores information related to the authorization and completion of the configuration change request. The ticket can include authorization fields, and implementation status fields. Preferably, authorizations for the change ticket can be provided by an operator input(s) 114 or other automated means such as electronic inputs from other electronic devices (not shown) coupled to the CMS 110. If all of the configuration change rules are met, the change ticket is authorized notification is given to the analytics module 120. Preferably, the change tickets are stored in a change ticket database 116 contained within or coupled to the CMS 110. Thus, the CMS 110 and change ticket database 116 may contain a number of configuration change requests, in varying stages of authorization and implementation. The CMS 110 can be a separate server, a process running on a server with other applications, or running an application on a personal computer. The change ticket data 116 base can be networked and can be directly or indirectly accessible by the analytics module 120 over the network.

An analytics module 120 is coupled to the CMS 110. The analytics module 120 enforces the configuration change process of the CMS 11.0 by configuring the selectable configuration locks 132 on the CCSs 130 to selectively enable or disable configuration changes to the CEs 135. The analytics module 120 receives configuration change rules. These configuration change rules are associated with the one or more CCSs 130 and the one or more CEs 135 within a CCS 130. The configuration change rules are configured through the rule input 112, which is preferably coupled to the analytics module 120. Also, contemplated are configuration rules received from other sources. Alternatively, the configuration change rules can be read directly from the CMS 110, derived from information retrieved from the CMS 110, or through another source (not shown) coupled to the analytics module 120. The analytics module 120, receives configuration change ticket information from the CMS 110. Preferably, the configuration change ticket information can be either requested from the CMS 110. However, the information can automatically be sent by the CMS 110 to the analytics module 120. Also contemplated by the invention is the analytics module 120 directly accessing the change ticket database 116. The configuration change ticket is preferably processed according to rules specified during the rule input 122 to determine if all the criteria for the configuration change process for an associated CEs 135 or an associated CCS 130 are being met. Also contemplated are one or more subsets of the CEs 135 meeting the configuration change process rules and the configuration change authorization being limited to these CEs 135. Preferably, the subset of CEs meeting the configuration change rule criteria will be authorized for making the configuration change. If all the criteria of the rules are met, then the analytics module 120 authorizes configuration changes the CEs 135. Also contemplated is a means to bypass the rules for generation an authorization in emergency situations.

Optionally, the configuration authorizing rules used by the analytics module 120 can include current conditions 126 in the determination for the authorization for the configuration changes to the CE. Exemplary of a current condition is the current time, date, and the day of the week. Preferably, if the authorizing rules criteria are met but the current conditions are not met, the authorization of the configuration change can be delayed until the time, day of the week, or date condition is met. Also, contemplated is the sending of a message to the selective configuration lock 132 containing a time window during which configuration changes are enabled. Another illustrative use of current conditions is the checking an inventory and requiring that a specified inventory level be available before authorizing a configuration change that would increase the production rate of an item.

When the configuration change authorization for all or some of the CEs 135 is met, the analytics module 120 will send a selective authorization message to a selective configuration lock 132 on the corresponding CCS 130 for the CEs 135 to be changed. The message will cause the selective configuration lock 132 to enable changes to the selective CEs. The message can be sent over a network where the analytics module 120 and the CCS 130 are located on separate systems remote from one another. The disabling of configuration changes to the CEs can be based on time, the completion of the configuration change to the CE, or by a message from the analytics module 120. Alternatively, the analytics module 120 can be a process or subroutine operating within the same processing system as the CCS 130 where the configuration authorization message is sent through inter-process communication means.

The analytics module 120 can receive status information from the selective configuration locks 132 regarding the occurrence of the success or failure of a configuration change, and the reasons for failure. This status information is stored in a change database 125. The change database 125 can later be used to generate reports regarding the status of the success configuration changes and change tickets. The analytics module 120 can associate status changes into groups based on type of configuration change, failed changes, and failure status information. Further the analytics module 120 can associate the changes with the configuration ticket database 116 to reconcile configuration change requests. As part of the reconciliation, information can be passed from the analytics module 120 to the CMS 110 to automatically update the status information for the associated change ticket indicating the final result of the configuration change.

The CCS 130 is coupled with the analytics module 120 preferably through a network. The CCS 130 contains one or more CEs 135. The CCS 130 also includes a selective lock 132 which is configured to prevent changes to the CEs 135 unless enabled by the analytics module 120. Preferably, the selective enabling of the selective configuration lock 132 contains a time window during which the enabled configuration changes can be made. The time window can vary by each configuration change for each CE 135. It can be desirable that the configuration changes to the CEs 135 are performed in a specific order. Having non-overlapping time windows for each enabled CE 135 configuration change can enforce such a sequence. Further information regarding the operation of the selective configuration locks 132 can be found in the co-owned application Ser. No. 11/346,741 titled "Enforcing Automatic Opening and Closing of an Existing Workflow" which is incorporated by reference. In general, the selective configuration lock 132 can be a hook into the file system driver of the CCS 130 to monitor and control changes to files associated with the CEs 135 and further associated with the configuration change ticket resulting from a change request 112. The selective configuration lock 132 can also include catching and monitoring triggers caused by a database modification. The selective configuration lock 132 can generate information regarding the status of a configuration change to a CE 135. This information can include whether the configuration change succeeded or failed. Further, the information can include information regarding why the change failed. This can include but is not limited to, incompatible operating system, insufficient memory to do the change, and insufficient permission to access a file. Preferably, information generated by the selective lock 132 is sent to the analytics module 120 but alternatively can be sent directly to the change database 125 for later processing, reference, and report generation. Configuration changes 140 to the CEs 135 preferably do not come from the analytics module 120 but are made directly to the CCS 130 or alternatively over a network. Exemplary of this process would be the loading of an updated application where the application files are the CEs 135 to be changed.

To prevent monitoring or unauthorized control over the selective configuration locks 132, the communication between the analytics module 120 and the selective configuration locks 132 can be encrypted and authenticated. Any authentication and encryption techniques can be used. Preferably the authentication and encryption technique uses a secure socket layer (SSL) using SSL key exchange to authenticate the selective enabling of the selective configuration lock.

The information generated by the selectable configuration lock 132, preferably stored in the change database 125, can be used to generate a variety of reports. First, the information can be used to reconcile the change ticket database 116 with the changes made to the CEs 135 and thus generating change compliance reports. Further, compliance reports can be organized by but not limited to user, CCS 130, CE 135, time, and type of change.

Figure 2:
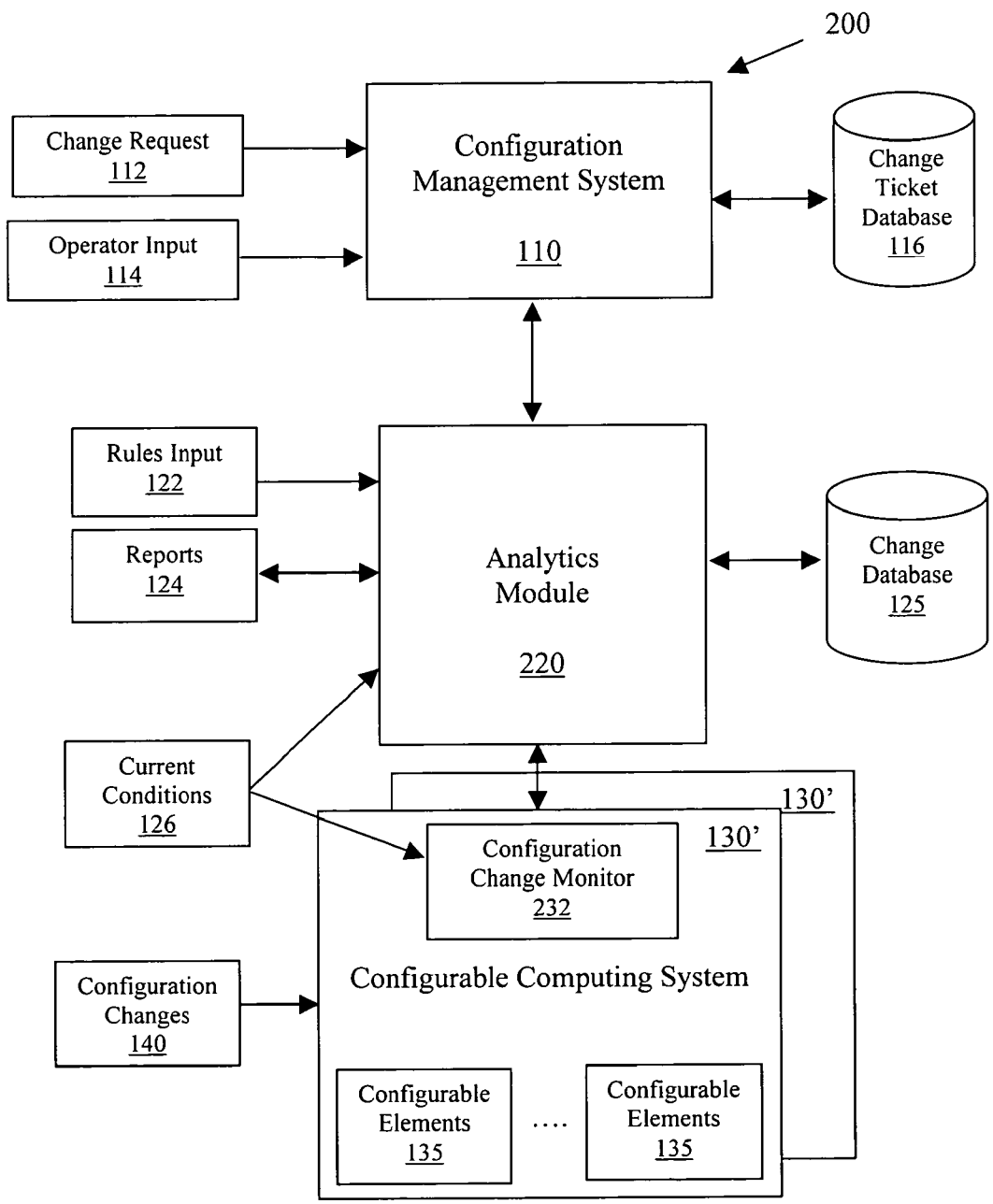
FIG. 2 illustrates a system for monitoring configuration changes to configurable elements within a configurable computation system and reconciling them against a configuration management process.

A second illustrative embodiment of the present invention is shown in FIG. 2. The system 200 for monitoring configuration changes to one or more configurable elements (CEs) 135 within a configurable computational system (CCS) 130. The monitoring generates a log of changes, that can be stored within a change database 125, which can be reconciled with authorized configuration changes in the change ticket database 116 as provided by the configuration management system (CMS) 110. The monitoring system comprises substantially the same elements as described in FIG. 1 with two primary differences. The analytics module 220 operates differently than for the system described for FIG. 1 and the selective configuration lock (132—FIG. 1) is replaced with the configuration change monitor 232.

The CMS 110 is used for generating an configuration changes(s) authorization for one or more CEs 135 within one or more CCSs 130 according to a specific business process. The operation of the CMS 110, the configuration change request 112 input to the CMS 110, the operator input 114, and the storage of the change request in the change ticket database 116, is the same as previously described for FIG. 1.

An analytics module 220 is coupled to the CMS 110. The analytics module 220 is a post configuration change analysis tool that analyzes changes in the change ticket database 116 according to configuration change rules input into the analytics module 220, and determines at least which configuration changes complied with the change process rules, which changes did not comply with the rules, configuration change made without an associated configuration change request, which change tickets were not completed, and reasons that the configuration changes failed. The configuration change rules preferably can be configured into the analytics module 220 from the rule input 122 but can be received from other sources. Alternatively, the configuration change rules can be acquired directly from the CMS 110, derived from information retrieved from the CMS 110, or through a source (not shown) coupled to the analytics module 220. The analytics module 220, can receive configuration change request information from the CMS 110. Preferably, the analytics module 220 directly accesses the change ticket database 116. The CMS 110 can signal the analytics module 220 when a change has occurred to the change ticket database 116.

Also contemplated by the invention is a report 124 interface for an operator requesting and receiving reports related to, reconciling the change ticket database 116 and the information in the change database 125 to determine what configuration changes were made, determining which changes were made conforming to within the configuration change process, and which changes were made outside the configuration change process. Preferably, the configuration change ticket information is requested directly from the change ticket database 116 or from the CMS 110 alternatively after the configuration changes are made to the CEs 135 within a CCS 130. However, the change ticket information can automatically be sent by the CMS 110 to the analytics module 220, stored and processed when reconciliation reports are generated. During analysis of the change ticket database 116 and the change database 125, the configuration change ticket is preferably processed according to rules input by the rules input 122 to determine if all the criteria for configuration change process for the associated CEs 135 are met. Also contemplated is analysis and reporting on an individual CE 135 basis or on a CCS basis.

Optionally, the configuration authorizing rules used by the analytics module 120 can include current conditions 126 in analyzing the configuration changes to the CEs. Exemplary of a current condition is the current time and the day of the week. If the analytics module 220 are to use the current conditions, then the change information stored in the change database 125 must include current condition information. It is contemplated that the current condition information is provided by the analytics module 220 or that the configuration change monitor 232 provides this information.

Information sent between the analytics module 220 and the CMS 110, the configuration change monitor 232 and the CMS 110 can be sent over a network. Alternatively, the analytics module 220 can be a process or subroutine operating within the same processing system as the CCS 130 where communication is provided through inter-process or processor communication means.

The analytics module 220 is configured to receive status information from the CCS 130 sent by the configuration change monitor 232 regarding the occurrence of a configuration change, status regarding a failure of an attempted configuration changes, and status regarding a successful configuration change. This information can be stored in a change database 125. The change database 125 can later be utilized to generate reports reconciling the change ticket database 116 and the change database 125. As discussed for FIG. 1, the analytics module 220 can associate changes into groups based on type of configuration change, failed changes, and failure status information. Further the analytics module 220 can associate the changes with the configuration ticket database 116 to reconcile configuration change requests. This reconciliation can be automatic where as part of the reconciliation process, information is passed from the analytics module 220 to the CMS 110 to automatically update the status information for the associated change ticket. This information can include closing a change ticket or noting a failure of a configuration change in the ticket.

The CCS 130 is coupled with the analytics module 220, preferably through a network. The CCS 130 contains one or more CEs 135. The CCS 130 also includes a configuration change monitor 232 which is configured to monitor changes to the CEs 135. Preferably, the change monitor 232 has access to the current conditions, such as date and time so that this information can be tagged to the status information generated. The status information which is generated can be sent as generated to the analytics module 220 or preferably directly to the change database 125. Also, contemplated is the ability of the change monitor 232 to store change information for later transfer to the analytics module 220 or change database 125. In general, the change monitor 232 can be a driver that is coupled to the file system of the CCS 130 to monitor and control changes to files associated with the CEs 135. The change monitor 232 can also include but is not limited to monitoring triggers generated by a database modification. The change monitor 232 can generate information regarding the status of a configuration change to a CE 135. This information can include whether the configuration change succeeded or failed. Further, when the change fails the information can include information regarding why the change failed. This can include but is not limited to, incompatible operating system, insufficient memory to do the change, and insufficient permission to access a file. Preferably, information generated by the selective lock 132 is sent to the analytics module 120 but alternatively or additionally can be sent directly to the change database 125 for later processing, reference, and report generation. Configuration changes 140 to the CEs 135 preferably do not come from the analytics module 120 but are made directly to the CCS 130 or over the network. Exemplary of this process is loading of an updated application where the application files are the CEs 135 to be changed.

A secure and authenticate channel can be used to communicated between the analytics module 220 and the change monitor 232. Any authentication and securing method can be implemented. Preferably the authentication scheme uses SSL (secure socket layer) using SSL key exchange to authenticate the analytic module 130.

The information generated by the change monitor 232, preferably stored in the change database 125, can be used to generate a variety of reports. First, the information can be used to reconcile the change ticket database with the changes made to the CEs 135 and thus generating change compliance reports. Further, compliance reports can be organized by user, system, type of configurable element, time, and type of change.

Figure 3:
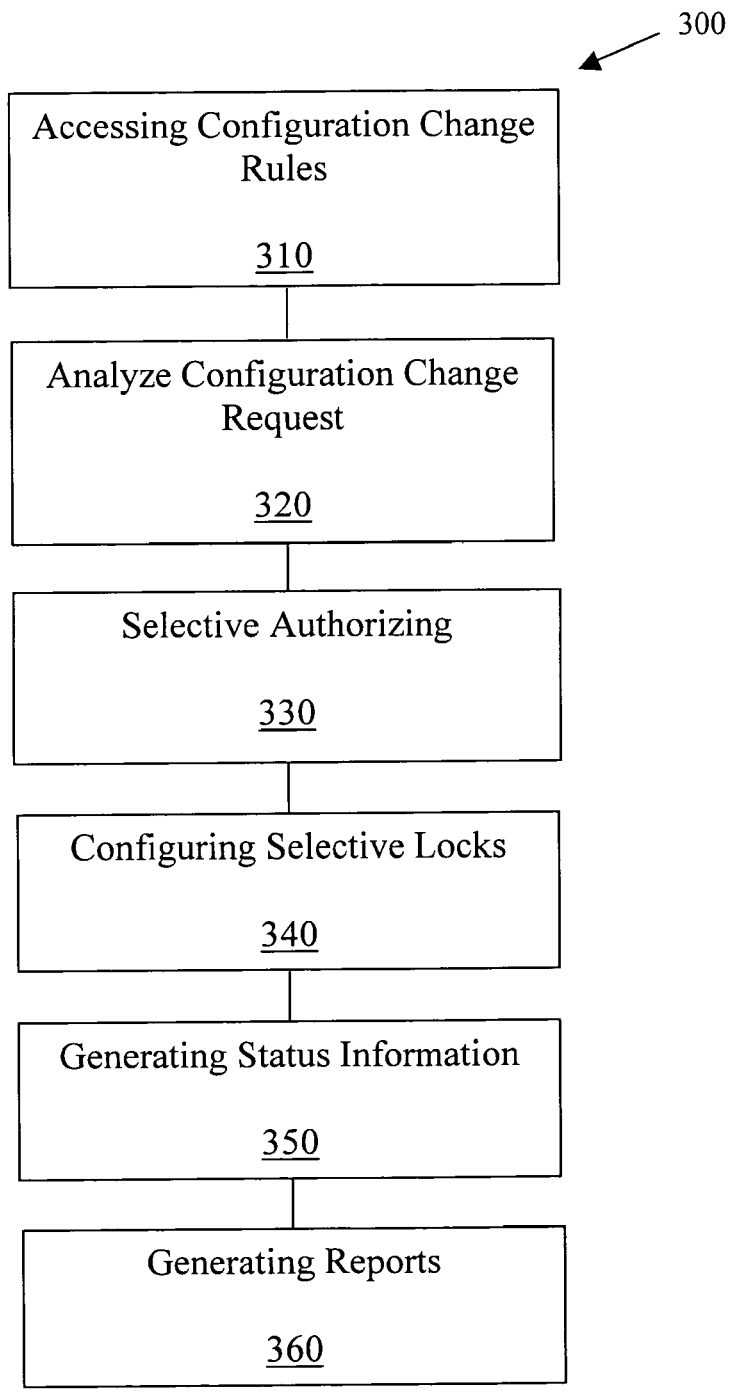
FIG. 3 illustrates the process for enforcing a configuration management process on configurable elements within a configurable computation system.

FIG. 3 is an illustrative embodiment of the process 300 for automatically enforcing a configuration change process for one or more configurable elements (CE) within a configurable computation system (CCS). In the step 310, the change process rules associated with the configurable elements within and configurable computation system are accessed. The rules can encompass a larger set of rules where only a subset of rules applies to specific CEs or a specific CCS. An exemplary embodiment of these rules is having authorizations by specific people, the availability of inventory, and performing a configuration change in a specified time window and on a specified day or day of the week. A configuration change request can embody that state of a request by containing information about who has authorized the configuration change, available inventory, or other information related to the request. The information within the configuration change request is evaluated against the rules for the associated CEs and CCSs referenced by a configuration change request.

In a step 320, the information associated with the configuration change request is analyzed using the rules associated with the CEs and CCS effected by the configuration change request. As part of the analysis, external conditions can be utilized. These include conditions like the current time of day, the date, and the day of the week. The analysis can find that some, none, or all of the associated CE have conformed to the rules for a configuration change.

In a step 330, configuration changes are selectively authorized for the CEs within the CCSs corresponding to the configuration change request. The authorization is based on analysis of the configuration change request and the configuration change rules. The authorization is communicated to at least one selective-lock which is used to provide selective enabling of configuration changes to the associated CEs. The communication is preferably over a network but other means are contemplated. Also, contemplated are secure authenticated communications. SSL (secure socket layer) can be used to secure encrypted the communications and authenticated by the use of SSL keys exchange.

In a step 340, one or more selective locks corresponding to one or more CCSs are configured to selectively allow configuration changes to the selectively authorized CEs. The selective enabling of CE configuration changes is based upon the selective authorizations generated in the step 330.

In a step 350, the selective locks generate status information regarding configuration changes made to enabled CEs.

This status information can include information about but not limited to when the change was made, whether the change succeeded or failed, and reasons for the success or failure. This information can be stored for later transmission to a central collection point, such as a database for later analysis and report generation. Also contemplated by the invention is the transmission of the status information over a network and through other processing elements before storage.

In a step 360, reports are generated based on the stored status information and the configuration change requests. The report generation can associate the status information with the associated configuration change request. Further, the report generation can associate the status information with the CE, CCS, or a combination of these.

Figure 4:
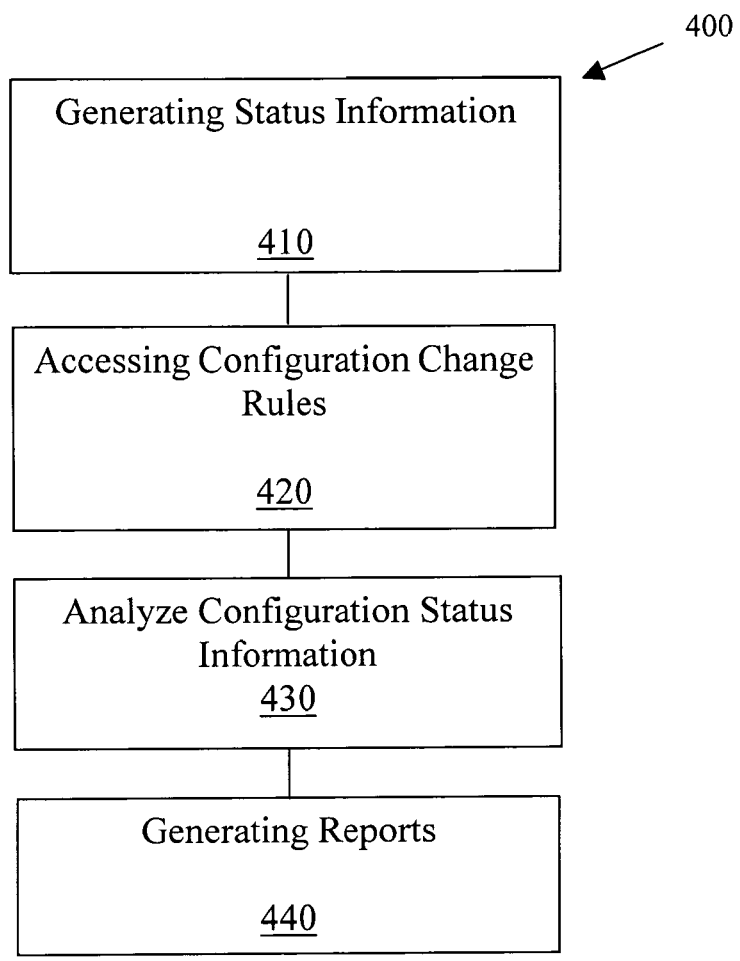
FIG. 4 illustrates the process for monitoring configuration changes to configurable elements within a configurable computation system and reconciling them with a configuration management process.

FIG. 4 is an illustrative embodiment of the process 400 for automatically monitoring a configuration change process for one or more CEs within one or more CCSs. In a step 410, a configuration change monitor generated status information regarding configuration changes made to CEs. This status information can include information about but not limited to when the change was made, whether the change succeeded or failed, and reasons for the success or failure of the configuration change. This information can be stored for later transmission to a central collection point, such as a database, for later analysis. Also, contemplated by the invention is the transmission of the status information through other processing elements before storage. Preferably the information is transmitted over a network.

In the step 420, the change configuration rules associated with the CEs corresponding to the status information generated in step 410 are identified. The one or more configuration change rules associated with a CE can be a subset of a larger set of rules. An exemplary embodiment of these rules is the requirement for authorization by specific people, the availability of inventory, and performing a configuration change in a specified time window and on a specified day or day of the week.

In a step 430, the information associated with the state of a configuration change request, the change ticket, is analyzed using the identified rules associated with the CEs and CCS and the associated status information generated in step 410. The change request state information or change ticket status information can be stored in a change ticket database. Part of the analysis, external conditions can be used. These include conditions like the current time of day, the date, and the day of the week. The analysis can determine that some, none, or all of the associated CE have conformed to the configuration change rules. Further, the processing determines whether there was a change configuration request. The results of such an analysis is saved in a form and structure such that the data can be used in the generation of reports associating status information with configuration change requests, CEs and CCSs.

In a step 440, reports are generated based on the stored status information and the configuration change requests. The report generation can associate status information with the associated configuration change. Further, the report generation can associate the status information with the CE, CCS, or a combination of these.

What is claimed is:

1. A method comprising:
   selectively monitoring configuration changes sent, over a network from an analytics module to one or more configurable elements (CEs) within a configurable computation systems (CCS), using one or more configuration change monitors corresponding to the one or more CEs, wherein the selective monitoring generates configuration change status information, wherein configuration change status information relates to an occurrence of a configuration change, failure of an attempted configuration change, or success of a configuration change and the configuration change status information is provided from the one or more configuration change monitors to the analytics module over the network;

managing, using a configuration management system, a configuration change process for the one or more CEs, wherein the managing generates one or more configuration change requests;

identifying, using the analytics module, one or more change configuration rules associated with the one or more CEs corresponding to the configuration change status information; and processing, using the analytics module, the configuration change status information, the one or more configuration change requests, and the one or more configuration change rules to determine (1) whether one or more configuration changes are associated with the one or more configuration change requests and (2) whether the one or more configuration changes complied with the one or more configuration change rules.

2. The method of claim 1, wherein the processing the configuration change status information utilizes one or more current conditions.

3. The method of claim 2, wherein the one or more current conditions include at least one of: a current time, a date, a day of the week, an inventory level, and a state of a mechanical device.

4. The method of claim 1, wherein the configuration change status information contains at least one of: the status of a CE configuration change, the status of a CCS configuration change, and information associated with success or failure of the one or more configuration changes.

5. The method of claim 1, further comprising associating the configuration change status information with the one or more configuration change requests.

6. The method of claim 5, wherein the associating the configuration change status information further associates the configuration change status information with the CCS of the associated one or more configuration change requests.

7. The method of claim 5, wherein the associating the configuration change status information further associates the configuration change status information with the corresponding one or more CEs of the associated one or more configuration change requests.

8. The method of claim 1, further comprising generating a report, wherein the report contains the configuration change status information, wherein the configuration change status information is associated with at least one of corresponding CEs and the corresponding CCS.

9. Logic encoded in non-transitory media that includes instructions for execution and when executed by a processor, is operable to perform operations comprising:
   selectively monitoring configuration changes sent, over a network from an analytics module to one or more configurable elements (CEs) within a configurable computation systems (CCS), using one or more configuration change monitors corresponding to the one or more CEs, wherein the selective monitoring generates configuration change status information, wherein configuration change status information relates to an occurrence of a configuration change, failure of an attempted configuration change, or success of a configuration change and the configuration change status information is provided from the one or more configuration change monitors to the analytics module over the network;

managing, using a configuration management system, a configuration change process for the one or more CEs, wherein the managing generates one or more configuration change requests;

identifying, using the analytics module, one or more change configuration rules associated with the one or more CEs corresponding to the configuration change status information; and processing, using the analytics module, the configuration change status information, the one or more configuration change requests, and the one or more configuration change rules to determine (1) whether one or more configuration changes are associated with the one or more configuration change requests and (2) whether the one or more configuration changes complied with the one or more configuration change rules.

10. The logic of claim 9, wherein the processing the configuration change status information utilizes one or more current conditions.

11. The logic of claim 10, wherein the one or more current conditions include at least one of: a current time, a date, a day of the week, an inventory level, and a state of a mechanical device.

12. The logic of claim 9, the operations further comprising associating the configuration change status information with the one or more configuration change requests.

13. The logic of claim 9, wherein the configuration change status information contains at least one of: the status of a CE configuration change, the status of a CCS configuration change, and information associated with success or failure of the one or more configuration changes.

14. The logic of claim 9, the operations further comprising generating a report, wherein the report contains the configuration change status information, wherein the configuration change status information is associated with at least one of corresponding CEs and the corresponding CCS.

15. One or more processors configured to execute instructions, the instructions, comprising:

selectively monitoring configuration changes sent, over a network from an analytics module to one or more configurable elements (CEs) within a configurable computation systems (CCS), using one or more configuration change monitors corresponding to the one or more CEs, wherein the selective monitoring generates configuration change status information, wherein configuration change status information relates to an occurrence of a configuration change, failure of an attempted configuration change, or success of a configuration change and the configuration change status information is provided from the one or more configuration change monitors to the analytics module over the network;

managing, using a configuration management system, a configuration change process for the one or more CEs, wherein the managing generates one or more configuration change requests;

identifying, using the analytics module, one or more change configuration rules associated with the one or more CEs corresponding to the configuration change status information; and processing, using the analytics module, the configuration change status information, the one or more configuration change requests, and the one or more configuration change rules to determine (1) whether one or more configuration changes are associated with the one or more configuration change requests and (2) whether the one or more configuration changes complied with the one or more configuration change rules.

16. The instructions of claim 15, wherein the processing the configuration change status information utilizes one or more current conditions.

17. The instructions of claim 16, wherein the one or more current conditions include at least one of: a current time, a date, a day of the week, an inventory level, and a state of a mechanical device.

18. The instructions of claim 15, wherein the configuration change status information contains at least one of: the status of a CE configuration change, the status of a CCS configuration change, and information associated with success or failure of the one or more configuration changes.

19. The instructions of claim 15, further configured for associating the configuration change status information with the one or more configuration change requests.

20. The instructions of claim 15, further configured for generating a report, wherein the report contains the configuration change status information, wherein the configuration change status information is associated with at least one of corresponding CEs and the corresponding CCS.

* * * * *